United States Patent [19]
White

[11] 3,971,470
[45] July 27, 1976

[54] X-RAY CASSETTE FILM HOLDER
[76] Inventor: Velton C. White, V. C. Labs, Inc., 17 N. Broadway, Des Plaines, Ill. 60016
[22] Filed: Sept. 26, 1974
[21] Appl. No.: 509,553

Related U.S. Application Data
[63] Continuation of Ser. No. 351,327, April 16, 1973, abandoned.

[52] U.S. Cl. ............................. 206/455; 250/481
[51] Int. Cl.² ........................................ B65D 85/48
[58] Field of Search ............ 206/455; 250/475, 476, 250/481, 485

[56] References Cited
UNITED STATES PATENTS

| | | | |
|---|---|---|---|
| 2,177,905 | 10/1939 | McKeehan | 45/131 |
| 2,590,891 | 3/1952 | Reuter | 250/68 |
| 2,810,837 | 10/1957 | Kizaur | 250/475 |
| 2,894,141 | 7/1959 | Kollock | 250/475 |
| 3,511,990 | 5/1970 | Hauss | 250/68 |
| 3,683,182 | 8/1972 | Farmer | 250/476 X |

FOREIGN PATENTS OR APPLICATIONS

| | | |
|---|---|---|
| 1,285,979 | 1/1962 | France |
| 1,189,846 | 3/1965 | Netherlands |

Primary Examiner—George E. Lowrance
Assistant Examiner—Steven M. Pollard
Attorney, Agent, or Firm—Olson, Trexler, Wolters, Bushnell & Fosse, Ltd.

[57] ABSTRACT

A cassette for holding x-ray film and the like is disclosed. A cam hinge urges a cassette lid and a tray into a closed film holding position from which visible light is excluded. The lid and tray are pulled toward one another by magnetic attractors located around the lid and tray edges. A low-stress latch secures the lid and tray in their closed position. A light lock within the tray insures the exclusion of visible light from the cassette interior.

18 Claims, 10 Drawing Figures

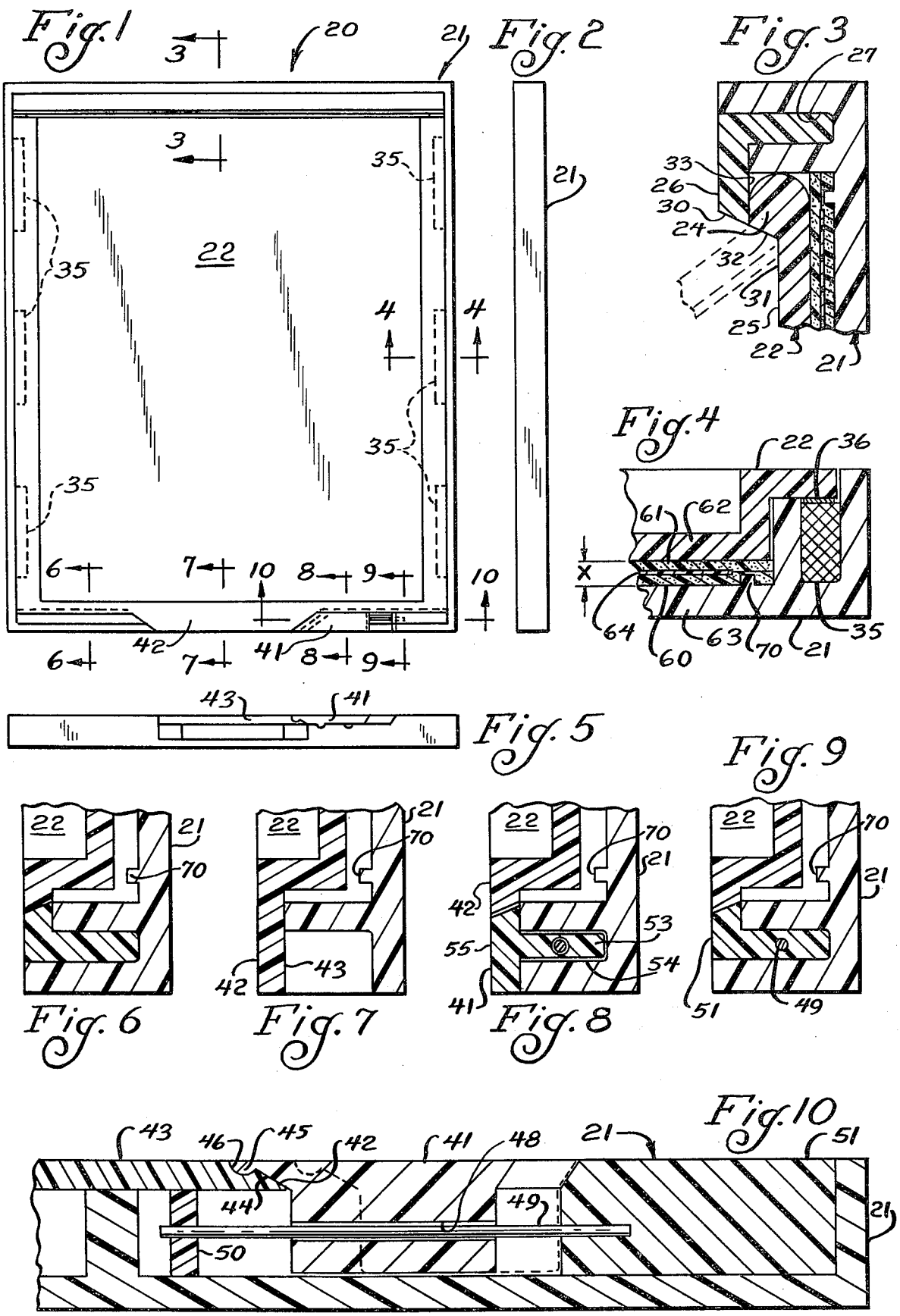

X-RAY CASSETTE FILM HOLDER

This application is a continuation of application Ser. No. 351,327, now abandoned.

BACKGROUND OF THE INVENTION

This invention relates to cassettes for holding x-ray film and the like.

Cassettes used to hold x-ray sensitive film or like material are widely used in medical and other disciplines requiring x-ray explorations. Typically, cassettes are used with x-ray machines found in hospitals, doctor's offices, and tuberculosis testing stations.

In general, such cassettes include a radiolucent box or tray and a mating cover or lid within which x-ray film can be disposed, usually in a planar configuration, for contact with an intensifying screen. After a cassette is loaded with x-ray film, it is inserted into an x-ray machine, the film is exposed, and the cassette is delivered to a development laboratory. Here, the film is removed and developed and the cassette is reloaded for subsequent use.

These cassettes must, of course, maintain a lighttight configuration when in use, to avoid accidentally exposing the x-ray film to visible spectrum light. Such accidental exposure can fog the film, and may render the x-ray exposure itself unusable.

Many presently offered x-ray cassettes are heavy and expensive. Some require the use of expensive parts formed to close tolerances to provide the requisite lighttight seal. Such parts can become worn, and hard usage or accidental droppage can permanently maladjust the parts, thereby rendering the cassette useless.

Moreover, some prior x-ray cassettes utilize hinges and latching devices to secure the lid and tray members in mutually light-tight configurations. The complexity of these latches and hinges can make insertion and removal of the film difficult, especially when inexperienced personnel are hurried by the force of circumstances. The latches and hinges are complex because they are highly stressed when in use; high stresses are needed to keep the cassette interior light-tight, and to keep the x-ray film flat and pressed into intimate engagement with the intensifying screen.

It is accordingly the general object of this invention to provide an inexpensive and highly commercial cassette holder for x-ray films and the like.

It is a more specific object of the invention to provide a cassette having a tray and mating lid which are automatically urged into tight engagement when they are closed together. A related object is to provide a cassette wherein the lid can be propped in an open position, or completely removed from the tray when desired.

It is another specific object of the invention to provide a cassette which will maintain itself in a closed condition without using complex or highly stressed latching devices. A related object is to provide a cassette which tends to stay closed even when dropped or handled roughly. Another related object is to provide a cassette having a latch which shows at a glance whether or not the cassette parts are locked in a closed position.

It is a further object of the invention to provide a cassette which provides a relatively high degree of light security without the use of expensive or complex parts or high stresses.

Other objects and advantages of the invention will become apparent upon reading the following detailed description, and upon reference to the drawings. Throughout the drawings, like reference numerals refer to like parts.

BRIEF DESCRIPTION OF THE DRAWINGS

FIG. 1 is a top plan view of the cassette showing the cassette tray and lid in their closed position;

FIG. 2 is a side elevational view showing the cassette in its closed position;

FIG. 3 is a fragmentary sectional view taken substantially in the plane of line 3—3 in FIG. 1 and showing in further detail the novel hinge mechanism and other parts of the present invention, the cassette intensifying screen being omitted for purposes of clarity;

FIG. 4 is a fragmentary sectional view taken substantially in the plane of line 4—4 in FIG. 1 and showing in further detail the magnetic closure mechanism of the present device with the cassette intensifying screen again being omitted;

FIG. 5 is an end elevational view showing in general aspect the front end of the novel cassette;

FIG. 6 is a fragmentary sectional view taken substantially in the plane of line 6—6 and showing the construction of one portion of the tray means;

FIG. 7 is a fragmentary sectional view taken substantially in the plane of line 7—7 in FIG. 1 and showing the interrelationship of the lid and tray at the tray handle area;

FIG. 8 is a fragmentary sectional view taken substantially in the plane of line 8—8 in FIG. 1 and showing in further detail the novel latch mechanism of the present invention;

FIG. 9 is fragmentary sectional view similar to FIG. 6 and 8 taken substantially in the plane of line 9—9 in FIG. 1 and showing in further detail the novel latch mechanism of the invention; and FIG. 10 is a fragmentary sectional view taken substantially in the plane of line 10—10 in FIG. 1 and showing in yet further detail the construction of the novel latch mechanism of the present invention.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning more specifically to the drawings, the novel cassette 20 of the present invention includes a lower tray member 21 for receiving an x-ray film and an upper detachable lid member 22 which, in general, covers the tray 21 and any film contained therein. These members can be formed of a radiolucent high impact polystyrene plastic which will withstand hard use without breaking or deforming, and can be dimensioned to any necessary size.

In accordance with one aspect of the invention, the lid 22 can be easily closed and opened or even completely detached from the tray member 21 by means of a novel hinge mechanism. As illustrated in FIG. 3 and elsewhere, this hinge mechanism includes a ridge member 24 which projects above the top lid surface 25 and engages an overhanging lip member 26 formed or mounted on the tray member 21. In the present embodiment, the overhanging lip member 26 takes the form of an insert which can be easily and permanently secured in a receiving slot 27 formed in one end of the tray 21. Engagement of the ridge member 24 under the lip 26 and subsequent rotation of the lid 22 toward the tray 21 causes the illustrated lid 22 to be cammed into the tray when the lid and the tray are closed together. To provide uniform action across the width of the cassette, the ridge 24 takes the form of a cylinder of substantially uniform cross-sectional shape which extends across the end of the lid.

It is a feature of the invention that the lid 22 can be propped in an open position to permit easy access to the tray interior for the removal or insertion of x-ray film. To this end, the lip 26 is provided with a beveled edge surface 30 formed to engage a mating surface 31 on the lid 22 and to support the lid 22 in an open position relative to the tray 21. If desired, additional support for the propped-open lid can be provided by a relatively planar surface portion 32 formed upon the ridge member 24 which engages the underside 33 of the lip 26. In order that the lid 22 can be propped open at an oblique angle to the tray 21, the lip member edge surface 30 and planar ridge surface 30 are beveled at corresponding oblique angles to the major plane of the tray.

In accordance with another aspect of the invention, the tray 21 and the lid 22 are pulled into and retained in a relatively closed position when they are moved toward one another. This is accomplished by providing a magnetically attracting substance around the periphery of either the tray or lid, and by providing a magnetically attractive substance around corresponding portions of the opposite cassette member. In the illustrated embodiment, permanent magnets 35 are located at spaced intervals around the periphery of the tray 21. Ferrous or nickel shims 36 which independently exhibit no magnetism of their own are mounted at corresponding locations around the periphery of the lid 22. It will be understood, however, that the shims 36 could be replaced by other magnets having poles oriented reversely relative to those located in the tray. Moreover, the magnets 35 themselves could be mounted upon the lid 22 and shims or other magnetically attractive substances could be located within the tray 21.

In accordance with yet another aspect of the invention, the lid 22 and tray 21 are mechanically retained in their mutually closed position by a low-stress latch mechanism 40. As shown in FIG. 10, the latch 40 includes a movable latch member 41 which is mounted upon the periphery of the tray 21 for selective engagement with a latch surface 42 formed upon one edge of a lid-mounted finger grip 43. As may be envisioned by reference to FIG. 7, this finger grip 43 permits the lid 22 to be grasped and easily pried away from the influence of the magnetic attractors 35 and 36.

When the cassette lid 22 is closed upon the tray 21, the beveled latch member 41 can be slid toward the finger grip 43 to engage a latching surface 44 formed thereon. On a latch member engagement surface 44, a small detent ridge 45 is formed which interlocks with a corresponding recess 46 formed upon the lid latch surface 42. This interlock secures the latch 41 in its latched position.

The latch member 41 can be secured for linear translational motion relative to the tray 21, but it will be understood that the latch member could be mounted upon the lid and the related parts appropriately rearranged. In the illustrated embodiment, the latch member 41 is provided with a small bore 48 which engages a guide rod 49. The guide rod 49 is mounted upon spacer members 50 and 51 which, in turn, are secured by glue or other convenient means within the tray 21 itself. In this embodiment, the substantially T-shaped latch member 41 has a base portion 53 mounted within the slot 54 and a head 55 formed for selective engagement with the lid 22. Equivalent structures may suggest themselves to those skilled in the art in the light of the foregoing disclosure.

It is a feature of the invention that a cassette user can determine at a glance whether the lid 22 has been securely latched in its closed condition relative to the tray 21. To accomplish this, the lid latching surface 44 is colored differently than the surrounding portions of the cassette. In the illustrated embodiment, it has been found useful to form the cassette of a black plastic material, and to paint or otherwise color the latch engaging surface 44 red. Thus, should the cassette operator notice any red color showing when the cassette is ostensibly ready for use, he will immediately understand that the latch mechanism has not been secured, and can take appropriate steps to either secure the latch mechanism, or check the x-ray film contained therein for inadvertent exposure.

It is yet another feature of the invention that the cassette 20 effectively excludes light from the contained x-ray film. First, the illustrated tray 21 and lid 22 are formed with the interfacing surfaces shown in FIGS. 4 and 6–9 which can be colored a light-absorbing black and which together act as a light baffle. Next, layers 60 and 61 of resilient material are interposed between a major planar lid area 62 and a planar tray area 63 to compress the film 64 firmly between the lid 22 and tray 21. This resilient material can be formed of closed face neoprene foam, and can be colored a light-absorbing black. Together, the layers 60 and 61 have a free-standing thickness greater than a predetermined distance X between the planar areas 62 and 63 of the closed tray and lid. Thus, when the film 64 is emplaced in the cassette and the tray 21 and lid 22 are closed together, the film 64 is squeezed firmly into its predetermined flat exposure position against one or more intensifying screens (not shown) and is surrounded by material which absorbs or rejects visible light but which is substantially transparent to x-rays.

In addition, either the tray or lid or both are provided with a land member 70 which protrudes from one of the major areas 62 and 63 and follows the periphery of the area around the cassette. However, as illustrated in FIGS. 4 and 6–9, the land member 70 is spaced a short distance inwardly of the edge of the major planar areas 62 and 63. This land member engages and additionally compresses the resilient materials 60 and 61, thereby further preventing the leaking impingement of light upon the film 64. Should the film 64 be slightly misplaced within the tray 21 and light accidentally leak around the tray-lid light baffle, only a thin edge portion of the film will be exposed. Light penetration to the interior of the major planar areas 62 and 63 will be prevented.

The invention is claimed as follows:

1. A cassette for holding film and the like having a separable hinge, comprising tray means having at one end an inflexible overhanging lip member and a recess of substantially uniform cross-sectional shape extending across the end of said tray means to provide a continuous, uniform closing pressure and lid means having at one end an inflexible ridge member of substantially uniform arcuate cross-sectional shape extending across the end of said lid means and projecting above the top surface of the lid means and formed to fit within said tray means recess for engagement with the overhanging lip member of the tray to cam the adjacent lid end at least partially into the tray means when the lid means and tray means are closed.

2. A cassette according to claim 1 wherein said lip member is provided with an edge surface for engaging a corresponding surface portion of said lid means to support said lid means in an open position relative to said tray.

3. A cassette according to claim 2 wherein said lip member edge surface is beveled at an oblique angle to the major plane of the tray means, and the lid means is provided with an abuttively mating planar surface whereby the tray means beveled edge surface can support the lid means in an open position at a corresponding oblique angle to the tray means.

4. A cassette for holding film and the like, comprising tray means adapted to carry a film sheet, and lid means for retaining the film sheet in the tray means, the tray means and lid means being at least partially separable to facilitate the insertion and removal of the film sheet, and a latch device for securing the tray means and lid means in a relatively closed position, the latch device comprising a slidable latch member having a base portion mounted within a rectangular slot formed in the periphery of the tray means for substantially linear motion and a latch head portion for selective latching engagement with peripheral surface portion of the lid means to secure the tray means and the lid means in a mutually closed position.

5. A cassette according to claim 4 including means for retaining said latch means in a locked condition.

6. A cassette for holding film and the like, comprising tray means having at one end an over-hanging lip member, and lid means having at one end a ridge member projecting above the top surface of the lid means and formed for engagement with the over-hanging lip member of the tray to cam the adjacent lid end at least partially into the tray means when the lid means and tray means are closed, and a latch device, said latch device comprising a movable latch member mounted upon a periphery of one of said means for selective latching engagement with a peripheral portion of the other of said means to secure the tray means and the lid means in a mutually closed position.

7. A cassette for holding film and the like, comprising tray means having at one end an over-hanging lip member, and lid means having at one end a ridge member projecting above the top surface of the lid means and formed for engagement with the over-hanging lip member of the tray to cam the adjacent lid end — at least partially into the tray means when the lid means and tray means are closed, one of said means being provided with magnetically attracting means around at least portions of its periphery, and the other of said means being provided with magnetically attractive means around corresponding portions of its periphery, the magnetically attracting and attractive means urging the tray means and lid means together into a mutually closed position.

8. A cassette according to claim 7 wherein said magnetically attracting means includes a first permanent magnet, and said magnetically attractive means includes at least a second permanent magnet placed for attraction by said first magnet when brought into proximity therewith.

9. A cassette according to claim 8 wherein said second magnet is positioned with its poles reversed relative to said first magnet when said lid means and tray means are located in their mutually closed positions.

10. A cassette according to claim 7 wherein said magnetically attracting means includes a first permanent magnet and said magnetically attractive means includes a substance capable of being attracted to said first magnet but independently exhibiting no magnetism of its own.

11. A cassette for holding film and the like, comprising tray means adapted to carry a film sheet for exposure, and lid means for retaining the film sheet within the tray means, one of said means being provided with a magnetically attractive means around at least portions of its periphery and the other of said means being provided with magnetically attractive means around corresponding portions of its periphery, the magnetically attracting and attractive means urging the tray means and lid means together into a mutually closed position, and a latch device, said latch device comprising a movable latch member mounted upon one of said tray or said lid means for selective latching engagement with a peripheral portion of the other of said tray or lid means to secure the tray means and the lid means in their mutually closed position.

12. A cassette for holding film and the like, comprising tray means having at one end an over-hanging lip member, and lid means having at one end a ridge member projecting above the top surface of the lid means and formed for engagement with the over-hanging lip member of the tray to cam the adjacent lid end at least partially into the tray means when the lid means and tray means are closed, one of said tray or lid means being provided with a magnetically attracting means around at least portions of its periphery, and the other of said lid or tray means being provided with magnetically attractive means around corresponding portions of its periphery, the magnetically attracting and attractive means urging the tray means and lid means together into a mutually closed position, and a latch device, said latch device comprising a movable latch member mounted upon the periphery of one of said tray or lid means for selective latching engagement with a peripheral portion of the other of said lid or tray means to secure the tray means and the lid means in their mutually closed position.

13. A cassette for holding film and the like, comprising tray means adapted to accept a sheet of film, and lid means adapted to press the film into the tray, the tray means and lid means each having major planar areas and being separated by a predetermined distance and shaped to accommodate the film, a layer of resilient material for interposition between the major planar areas and having a free-standing thickness greater than said predetermined distance for compressing the film between the major planar areas with a first pressure and a rigid land member protuding from at least one of said major planar areas and following the periphery of said area but spaced inwardly thereof, the land member being adapted to engage and additionally compress the resilient material inwardly of its periphery to prevent the leaking impingement of light upon film disposed within the area defined by said land member.

14. A cassette according to claim 13 wherein said layer of resilient material is formed of closed face neoprene foam.

15. A cassette according to claim 13 wherein said tray means and lid means are formed of a radiolucent high impact polystyrene plastic.

16. A cassette according to claim 13 wherein one of said tray or lid means is provided with a magnetically attracting means around at least portions of its periphery, and the other of said lid or tray means is provided with magnetically attractive means around corresponding portions of its periphery, the magnetically attracting and attractive means urging the tray means and lid means together into a mutually closed position.

17. A cassette according to claim 13 including a latch device, said latch device comprising a movable latch member mounted upon the periphery of one of said tray or lid means for selective latching engagement with a peripheral portion of the other of said lid or tray means to secure the tray means and the lid means in a mutually closed position.

18. A cassette according to claim 13 wherein said tray means has at one end an over-hanging lip member, and said lid means has at one end a ridge member projecting about the top surface of the lid means and formed for engagement with the over-hanging lip member of the tray to cam the adjacent lid end at least partially into the tray means when the lid means and tray means are closed.

* * * * *